L. G. ORSOLINO.
ELECTRIC BATTERY ELECTROLYTE.
APPLICATION FILED FEB. 7, 1922.
1,427,011.
Patented Aug. 22, 1922.
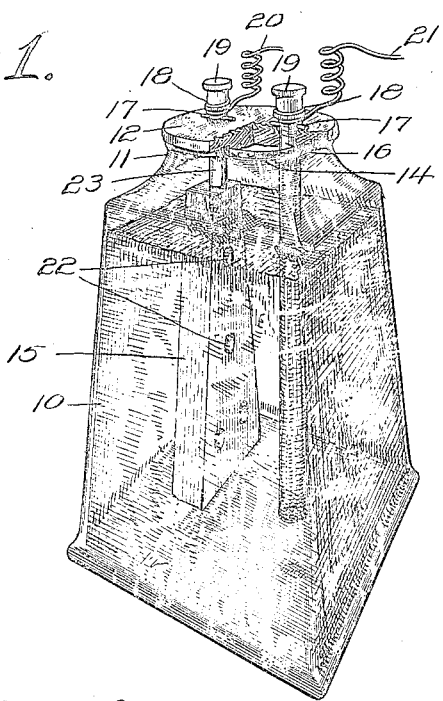
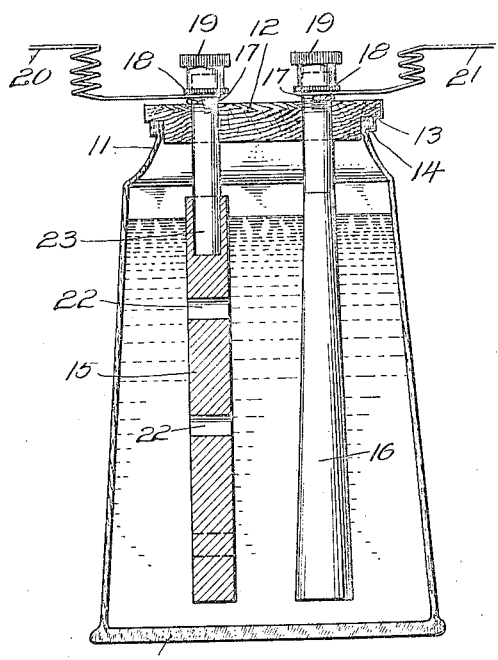
INVENTOR.
Leocadio G. Orsolino.
BY
Geo. F. Kimmel
ATTORNEY.

UNITED STATES PATENT OFFICE.

LEOCADIO G. ORSOLINO, OF MANILA, PHILIPPINE ISLANDS.

ELECTRIC-BATTERY ELECTROLYTE.

1,427,011. Specification of Letters Patent. Patented Aug. 22, 1922.

Application filed February 7, 1922. Serial No. 534,743.

*To all whom it may concern:*

Be it known that I, LEOCADIO G. ORSOLINO, a citizen of the United States, residing at Manila, Philippine Islands, have invented certain new and useful Improvements in an Electric-Battery Electrolyte, of which the following is a specification.

This invention appertains to certain improvements in electrical batteries, and more particularly to the type of the same employing liquid electrolytes.

The principal object of the invention is to provide for an electrical battery of the class mentioned, and one of an extremely simplified construction and arrangement, inexpensive in manufacture and of high efficiency and long life in operation.

Another object of the invention is to provide a battery as aforesaid, and one embodying a special form of positive electrode or anode, so constructed and arranged as to have an increased area thereof contacted by the electrolyte of the battery, and in the use of which, the chance for polarization of the battery is reduced to a minimum.

A further object of the invention is to provide for a battery of the type mentioned, and, for use in the same, a cheap natural form of electrolyte consisting of a liquid or vinegar obtained by extracting the sap from the nipa or cocoanut palm trees, or other forms of such palm trees or shrubbery such as are found principally in the Philippine Islands.

With the foregoing and other objects in view, the invention resides in the certain novel features of construction, and arrangement of the parts of the battery as aforesaid, and of the negative electrode thereof, as well as in the electrolyte used in the said battery, as will be hereinafter more fully described, set forth in the appended claims, and illustrated, in part, in the accompanying drawings, in which:—

Figure 1 is a perspective view of the improved form of battery, and,

Fig. 2 is a vertical section therethrough.

Referring to the drawings, the numeral 10 indicates a battery container, jar or cell, preferably formed of glass or the like and which has its side walls tapered upwardly from the bottom thereof substantially as shown. The upper open end of the container or jar 10 is preferably formed by an inturned and upwardly curving lip portion 11, shaped to provide a circular opening for the reception of a closure 12, the latter being preferably made from a hard wood and undercut at its under peripheral edge to provide an annular groove per se snugly fitting the beaded or thickened edge 14 of the lip portion 11. This closure 12 is drilled to provide a pair of diametrically alined openings for the reception of the upper end portions of an anode 15 and a cathode 16, which end portions having openings extending diametrically therethrough to receive supporting pins or the like 17, which, when properly positioned within the openings, rest on the upper face of the closure 12 for such purpose, and, immediately above the pin receiving openings, each of the electrodes are threaded to receive thereon a securing nut 18 and a binding nut 19 for the passage between the same of the circuit leads 20 and 21. The anode 15 is preferably of a carbon composition, especially made as will be hereinafter more fully explained, and the cathode 16 of zinc. The closure 12 is preferably coated, in its entirety, in any suitable or known manner with paraffin or the like, whereby to prevent leakage between the connections of the anode 15 and the cathode 16 of the current output of the cell.

The positive anode 15 is preferably prepared in the following manner:—A suitable quantity of carbon is crushed to a coarse powdered form and is then mixed with a small amount of manganese oxide or other suitable depolarizing agent, together with a binding agent of a gummy or sticky nature, and is then molded into proper form under great pressure. This anode composition is molded in a manner to provide for a series of openings or ducts 22 passing transversely through the same, whereby to greatly increase the active area of the anode contacted by the electrolyte, and to otherwise facilitate and equalize the chemical action of the latter within the cell or jar 10. A post 23, preferably formed of an alloy of iron and brass, is secured in the upper end of the anode 15, substantially as shown, and forms the binding post for the same as hereinbefore described as being supported from one of the pins 17, and having a securing nut 18 and a binding nut 19 threaded thereon.

The battery cell as above described may employ any of the commonly known electrolytes, but the present invention contemplates the use of an acid electrolyte or vinegar obtained in natural state from the sap of certain of the palm trees or shrubbery found particularly in the Philippine Islands, among which are the nipa and cocoanut palms. To prepare the electrolyte or vinegar, the sap is extracted from the palm tree in any suitable or known manner, and is fermented. The liquid or vinegar obtained from this fermentation of the sap, called "tuba," is found to have an acid equivalent to a four per cent solution of acetic acid, and a solid content of about two and one-half per cent. As the result of this acid content of the vinegar or fermentated tuba, its use as the electrolyte in battery cells compares favorably with the results obtained in the use of the usual salammoniac or sulphuric acid solutions now employed in the latter, and particularly in those types of the same as are used on telegraphic systems or lines. The comparative ampere and voltage output of cells employing on the one hand the usual salammoniac solution or electrolyte and, on the other hand, the vinegar or fermentated tuba electrolyte, is as follows:—

| E. M. F. Salammoniac. | Volts. Fermentated tuba. | Current. Salammoniac. | Amperes. Fermentated tuba. |
|---|---|---|---|
| 4.3 to 4.8 | 4.3 to 4.8 | 1.8 to 2.3 | 1.6 to 2.0 |

This vinegar or fermentated tuba electrolyte can be manufactured cheaply and sold at a cost of about 75% less than the present market price of salammoniac, and, in use, has been found to cause less corrosion of the electrodes of a battery cell, and to retain its effective strength a much longer time than the salammoniac solution, which, in actual practice, was ascertained to be approximately ten months for the fermentated tuba electrolyte to six months for the salammoniac solution.

From the foregoing, it will be readily apparent that the construction involved in the battery cell may be construed to be that of a simplified modification of the well known leclanche type of primary battery cell, and that the arrangement of the parts thereof provides for a marked efficiency and great durability in use; that the same can be cheaply manufactured, and that it can be used for any purpose wherein it is common in the practice to employ primary battery cells. Also, that the form of positive anode used, and of the provision of a plurality of openings therein, provides for a greater and better chemical action of the electrolyte thereon and throughout the cell as a whole, and that, by incorporating within the same of a suitable quantity of manganese oxide as a depolarizing agent, the possible chance for the polarization of the battery cell is reduced to a minimum. Again, the electrolyte to be employed in this and other forms of battery cells, is easily and cheaply obtained and used in practically its natural state, except for the short period of time required for the fermentation of the sap or "tuba," and that it produces practically the same amperes and voltage output from a cell as that of known types of such cells employing more expensive electrolytes, but with less corrosive action on the electrodes of the cells, and with a longer period of life as compared with the latter.

It is well understood, that, while a preferred embodiment of the battery, anode and electrolyte have been described herein in specific terms, various changes in and modifications of the same may be resorted to without departing from the spirit of the invention, or the scope of the claims appended hereto.

Having thus fully described the invention, what is claimed is:—

1. An electrolyte for primary battery cells consisting of vinegar obtained by fermentation of the sap extracted from palm trees.

2. An electrolyte for primary battery cells, consisting of vinegar obtained by fermentation of the sap extracted from palm trees such as the nipa and cocoanut palm species thereof.

In testimony whereof, I affix my signature hereto.

LEOCADIO G. ORSOLINO.